United States Patent [19]
English

[11] Patent Number: 6,073,532
[45] Date of Patent: Jun. 13, 2000

[54] COVE MOLDING SETUP DEVICE AND METHOD

[76] Inventor: Capel C. English, 4340 Park Brooke Trade, Alpharetta, Ga. 30022

[21] Appl. No.: 09/317,816

[22] Filed: May 25, 1999

[51] Int. Cl.[7] .............................. B27B 5/02; B26D 7/02
[52] U.S. Cl. ............................ 83/875; 83/468.2; 83/581; 83/477.2; 83/468.3; 83/861; 33/640; 144/134.1; 144/204.2; 144/253.1; 144/253.5
[58] Field of Search .................... 83/468.2, 468.3, 83/581, 435.12, 477.2, 861, 875; 33/613, 626, 628, 640, 641, 645; 144/134.1, 136.1, 204.2, 253.1, 253.5

[56] References Cited

U.S. PATENT DOCUMENTS

| | | | |
|---|---|---|---|
| 2,916,063 | 12/1959 | Boekenkamp | 144/136.1 |
| 2,972,366 | 2/1961 | Caruso | 144/204.2 |
| 3,738,211 | 6/1973 | Carter, Sr. | 83/522 |
| 4,002,329 | 1/1977 | Petrowski | 269/318 |
| 4,350,066 | 9/1982 | Volk . | |
| 5,016,508 | 5/1991 | Hallenbeck . | |
| 5,379,670 | 1/1995 | Ferry . | |
| 5,402,701 | 4/1995 | Ingram . | |
| 5,617,909 | 4/1997 | Duginske | 144/253.1 |
| 5,988,242 | 11/1999 | Minardi | 144/253.1 |

*Primary Examiner*—W Donald Bray
*Attorney, Agent, or Firm*—Kennedy, Davis & Hodge LLP

[57] ABSTRACT

A cove molding setup device comprising a platform having a bottom fork adapted to be supported upon a saw table arbor beside a disc blade; a slide bar mounted upon said platform at a plurality of transverse positions with respect to said base fork; a protractor mounted to said slide bar at a plurality of rotatably adjustable angles about a pivot; and a fence guide bar adjustably mounted to said protractor at a plurality of distances from said pivot.

9 Claims, 5 Drawing Sheets

(h) = cove depth (in)

| (A) = blade angle (deg) | 1/8 | 1/4 | 3/8 | 1/2 | 5/8 | 3/4 | 7/8 | 1 |
|---|---|---|---|---|---|---|---|---|
| 85 | 2 3/16 | 3 2/16 | 3 13/16 | 4 5/16 | 4 13/16 | 5 4/16 | 5 10/16 | 6 |
| 80 |  | 3 1/16 |  |  |  |  |  | 5 15/16 |
| 75 |  | 3 |  |  |  |  |  | 5 18/16 |
| 70 | 2 1/16 | 2 15/16 | 3 9/16 | 4 2/16 | 4 9/16 | 4 15/16 | 5 5/16 | 5 10/16 |
| 65 |  | 2 13/16 |  |  |  |  |  | 5 7/16 |
| 60 |  | 2 11/16 |  |  |  |  |  | 5 3/16 |
| 55 |  | 2 9/16 |  |  |  |  |  | 4 15/16 |
| 50 |  | 2 6/16 |  |  |  |  |  | 4 10/16 |
| 45 |  | 2 3/16 |  |  |  |  |  | 4 4/16 |
| 40 |  | 2 |  |  |  |  |  | 3 14/16 |
| 35 |  | 1 13/16 |  |  |  |  |  | 3 7/16 |
| 30 |  | 1 9/16 |  |  |  |  |  | 3 |
| 25 |  | 1 5/16 |  |  |  |  |  | 2 9/16 |
| 20 |  | 1 1/16 |  |  |  |  |  | 2 1/16 |
| 15 |  | 13/16 |  |  |  |  |  | 1 9/16 |
| 10 |  | 9/16 |  |  |  |  |  | 1 1/16 |
| 5 | 3/16 | 4/16 | 5/16 | 6/16 | 7/16 | 7/16 | 8/16 | 8/16 |

COVE MOLDING SETUP DEVICE AND METHOD

TECHNICAL FIELD

This invention relates generally to the formation of coves in wood working, and particularly to devices and methods of setting up a saw table preparatory to the cutting of a cove of a selected size and location in stock material as in a strip of molding, raised panel or the like.

BACKGROUND OF THE INVENTION

Saw tables have long been used for cutting materials. They have a flat table top through which a disc saw blade protrudes for cutting materials, usually wood, slid over the surface of the table top. This top has linear slots that straddle the blade in parallel relation with it. These slots are used to mount guides which are referred to as fences, against which a workpiece may be slid and guided over the rotating saw blade.

In addition to the mere cutting of workpieces to desired sizes, these saw tables have also been used in forming elongated, usually curved grooves or depressions called coves in strips of stock material for aesthetics. This is done by setting the guide or fence upon the table top at an angle to the disc blade. When a strip of molding, for example, is slid along the fence, the disc blade forms a curved, elongated channel or cove. The shape of the curved cove depends on the angle of attack of the strip against the blade. The greater the angle the more the cove approaches a semicylindrical shape. Conversely, the lesser the angle the steeper a parabolic shape is formed. The depth of the coves depends on the maximum height or apex that the blade reaches above the table top. The spacing or location of the cove from an elongated edge of the workpiece depends on the proximity of the fence to the blade.

Though the just described general parameters are well known, it has been difficult to implement them in practice with any degree of precision. Usually the workman simply sights the parameters and uses a trial and error approach. This consumes time and waste.

Accordingly, were a setup device and method to be devised that utilize numeric measures, be they linear, angular or both, a definitive advance in the art would be achieved. It thus is to the provision of such that the present invention is primarily directed.

SUMMARY OF THE INVENTION

In a preferred form of the invention, a cove molding setup device is provided for a saw table that has a disc blade which emerges from and penetrates the plane of the table top at a blade intersection point. The device has a platform adapted to be mounted to the saw table over the blade, a rip fence guide bar, and means for mounting the guide bar upon the platform for rotational adjustment about a pivot. The device also has means for positioning the pivot within the plane of the blade at selected distances offset from the blade intersection point.

In another preferred form of the invention a method is provided for locating a rip fence upon a saw table for cutting a cove of a selected depth and width at a selected spacing from an edge of a strip of molding. This is done by locating a pivot in the plane of the saw table laterally offset from the axis of blade rotation a distance relative to the maximum height of the blade above the saw table. A fence guide bar is positioned at a distance from the pivot relative to the desired spacing of the cove from an edge of the molding. The guide bar is angularly positioned with respect to the blade plane about the pivot at an angle equal to a function of the desired depth and width of the cove.

DETAILED DESCRIPTION

Figure 1:
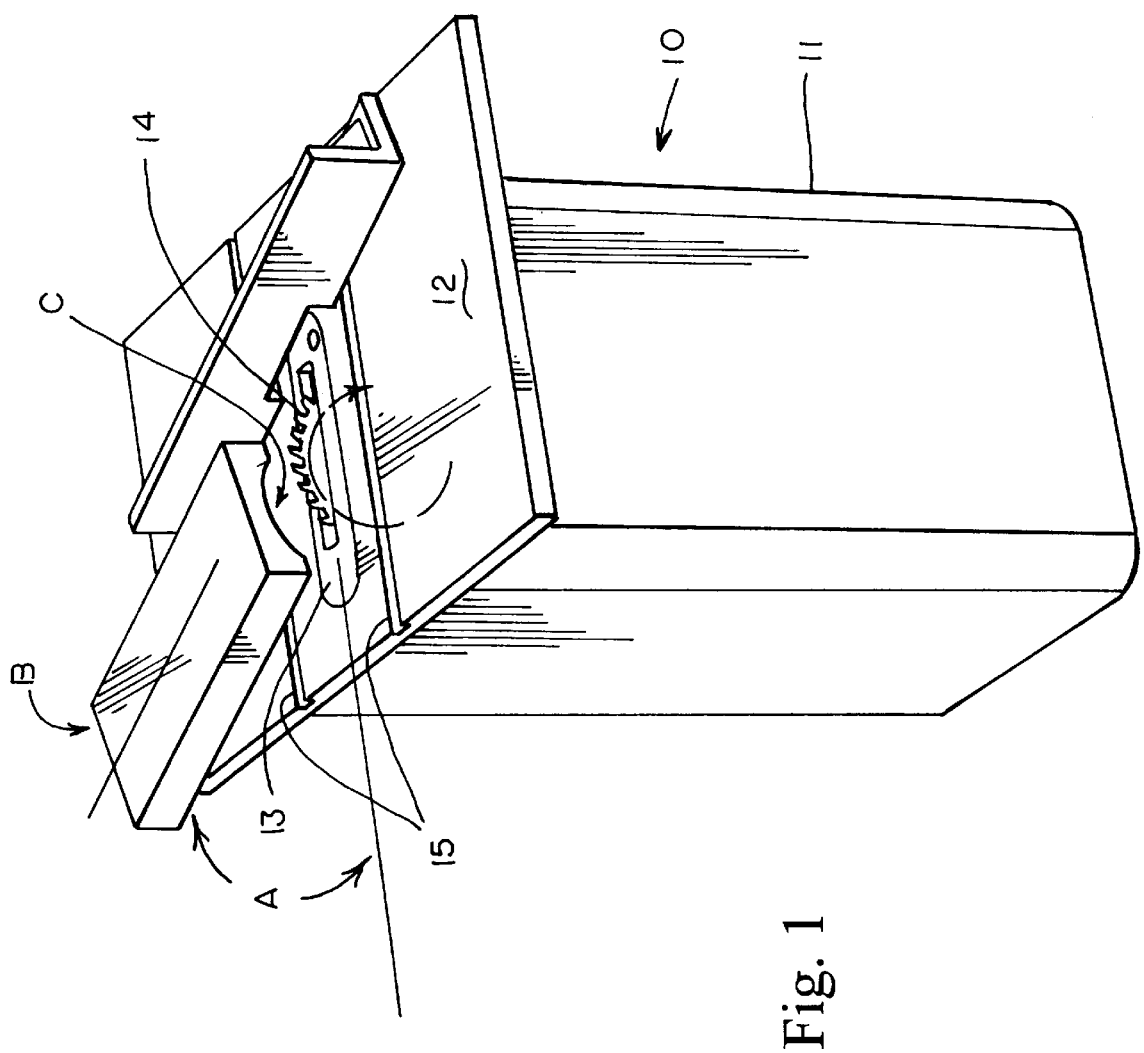
FIG. 1 is a perspective view of a conventional saw table being used in forming a molding cove.

With reference next in detail to the drawings, there is shown in FIG. 1 a conventional table saw 10 having a stand 11 that supports a substantially flat table with a top 12 that has with a central recess that is removably covered with an insert 13. The insert has a slot through which a disc-shaped saw blade 14 extends above the table top. The blade is rotatably driven in the direction indicated by the arrow by an unshown motor housed within the stand 11. The blade is straddled by two slots or grooves 15 that extend parallel to the plane of blade rotation in providing a miter gauge track. A rip fence or guide 16 is shown mounted atop the table top 12 by unshown fasteners located in the miter gauge track or by C-clamps. A board B is shown with a cove C that has just been formed in it by having been slid alongside the rip fence 16 over the blade 14.

Figure 2:
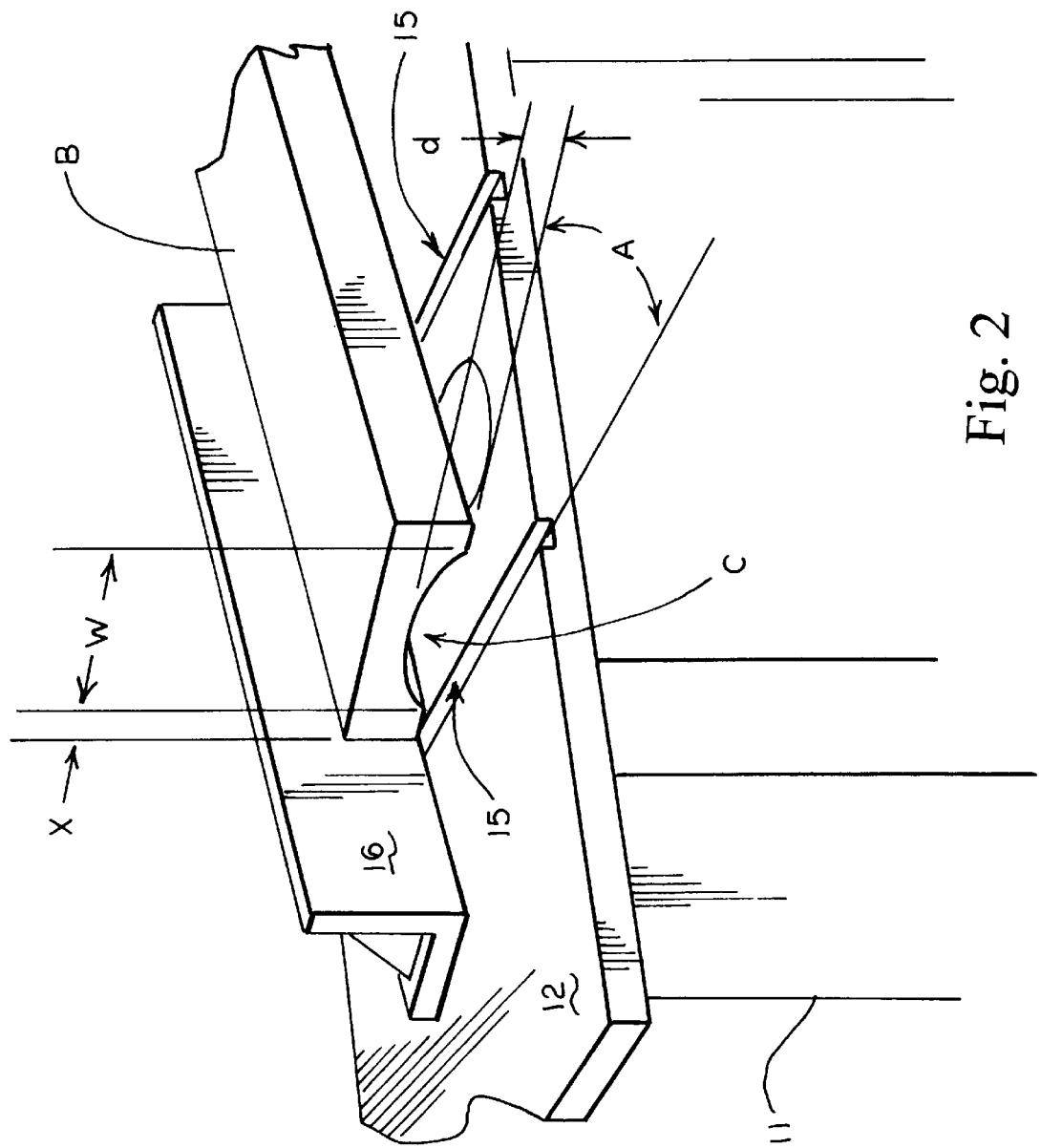
FIG. 2 is a diagram that defines geometric parameters used herein.

As shown in FIG. 2 the cove C has a depth d, a width w and is spaced a distance x from an edge of the board B. The cove has been formed by passing the board flushly aside the fence 16 at an angle a to the track and blade, a 90° angle representing the fence being parallel to the blade. All of this is conventional, the invention being related to the locating of the rip fence along the track.

Figure 3:
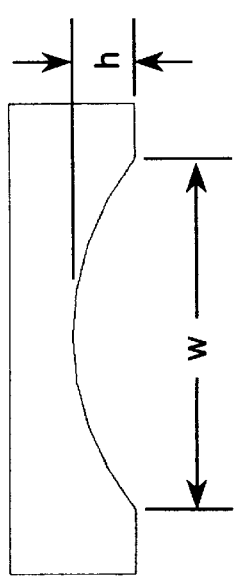
FIG. 3 is a reference table used in establishing the angle of the rip fence guide for a cove of a selected depth and width.

There exists a mathematical relationship between the blade angle a and the size and shape of the cove. Not accounting for the thickness of the blade, this is expressed as:

$$w \cong 2\sqrt{r^2 - (r-d)^2} \cdot \sin\left(\frac{\pi}{180} \cdot a\right)$$

where w is the cove width, d is the cove depth, r is the blade radius and a the angle previously identified. The table of FIG. 3 provides angles a for coves of desired depths d and widths w that are derived from this equation.

For example, for a cove depth of ¾ inches and a cove width of 4$^{15}$⁄$_{16}$ inches, an angle of 70° is applicable.

Figure 4:
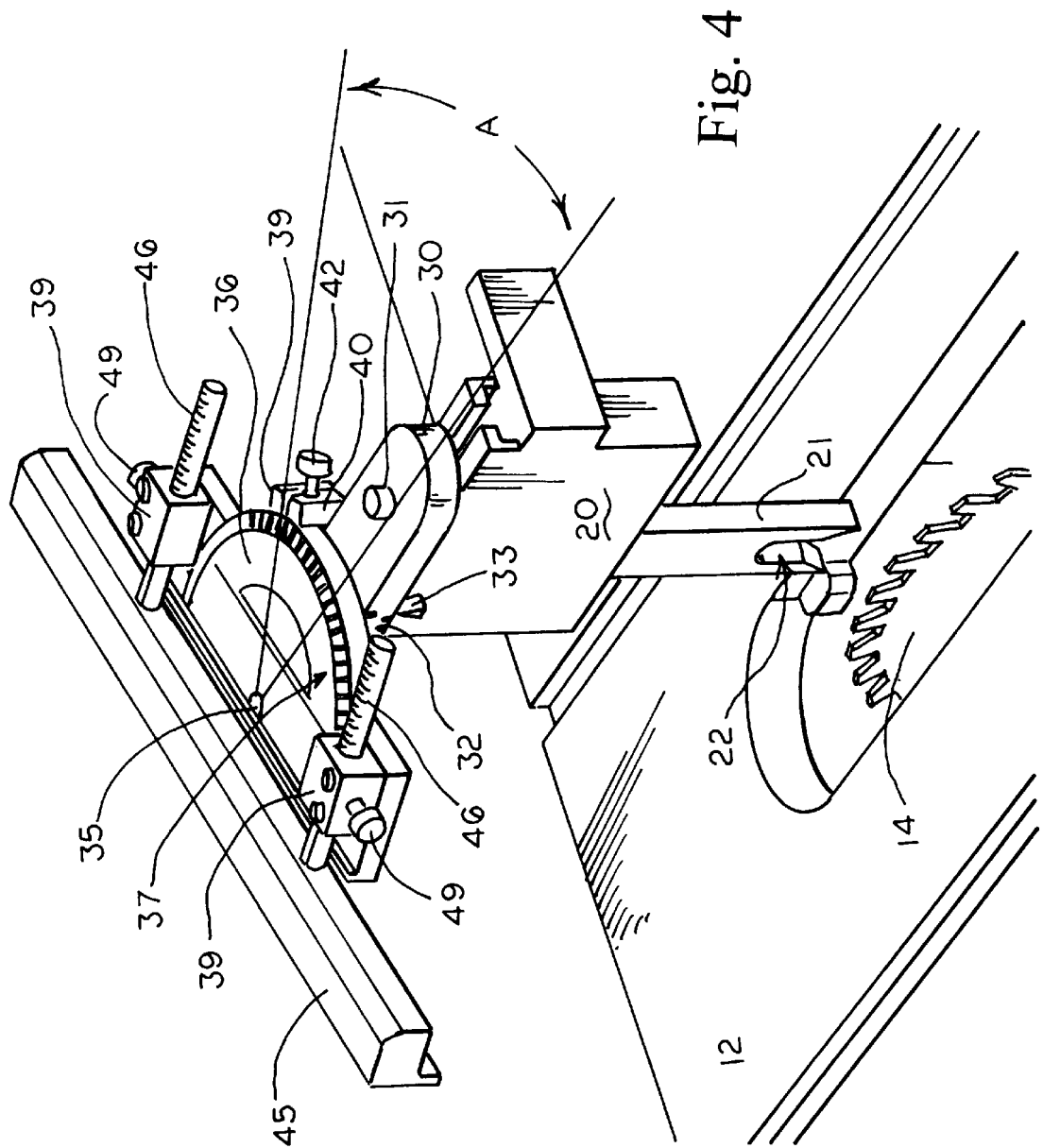
FIG. 4 is a perspective view of a setup device embodying principles of the invention in a preferred form shown positioned above a saw table.
Figure 5:
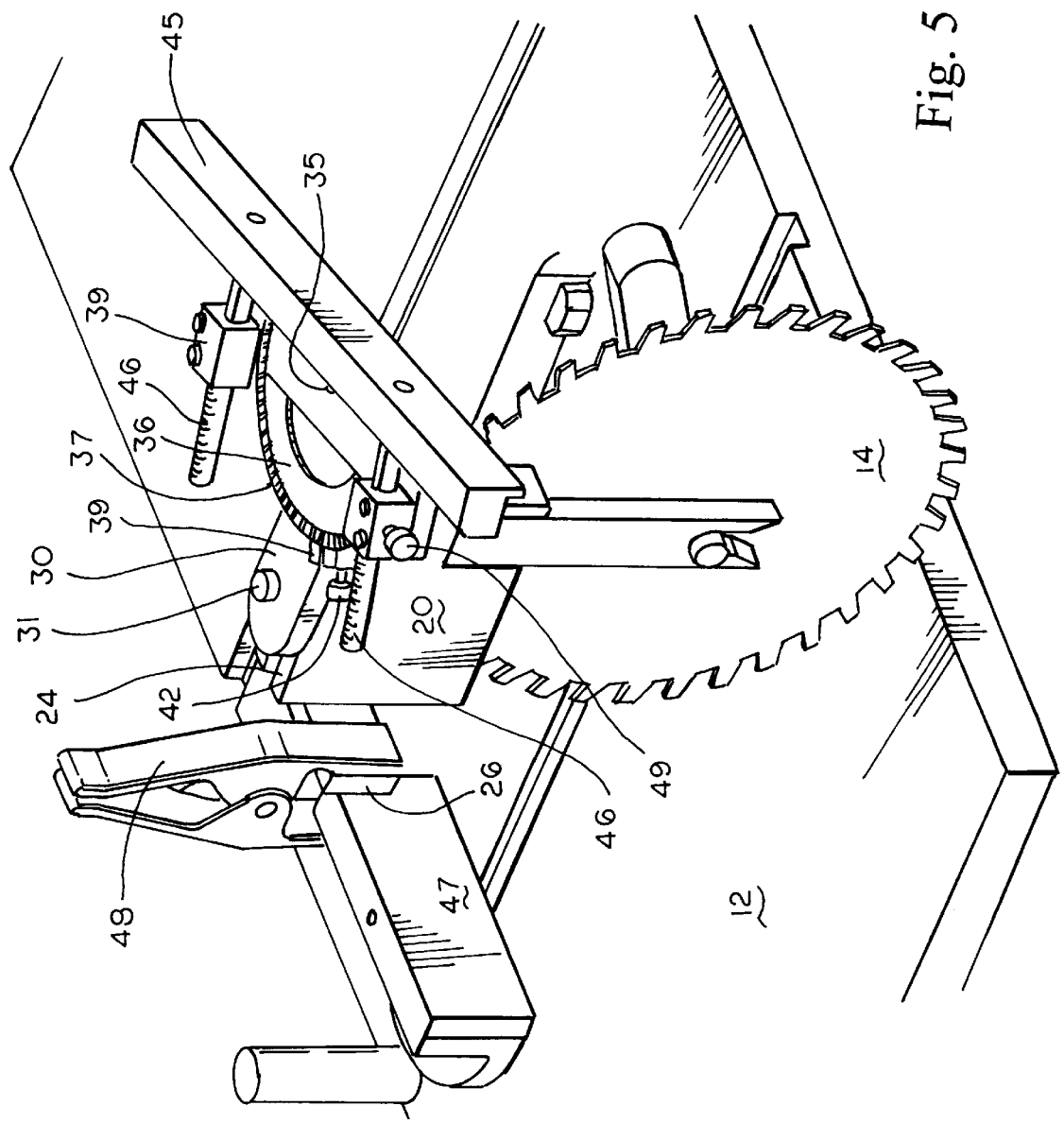
FIG. 5 is another perspective view of the setup device shown in FIG. 4 shown mounted on the saw table.

With reference to FIGS. 4 and 5, the fence setup device is seen to have a platform 20 that is of a width to be snugly mounted in the table saw recess with the insert 13 temporarily removed. The platform has a bottom fork 21 with a channel 22 between the fork tines which is sized and shaped to rest flushly upon the arbor 23 of blade 14. The top 24 of the platform is flat and has a T-shaped track 25. The platform also has a clamping stud 26.

The setup device also has a slide bar 30 with an unshown bottom rail that is slidably received in the platform track 25.

A set screw 31 is provided for locking the slide bar in place atop the platform along the track. A scale 32 is provided on the side of the slide bar that may be passed over a platform cursor 33. The scale denotes fractions of inches from ⅛ inch to 1 inch that correspond to the maximum height that the disc blade extends above the table top 12. The slide bar also has a pivot pin 35 that is located in the plane of the blade 14, the blade passing through an unshown slot in the bottom of the platform to one side and above the fork 21.

The setup device also has a protractor 36 pivotably mounted to pivot 35 atop the side bar with angle a indicia located at 37 expressed in degrees. This indicia extends past another cursor 39 displayed on a block 40 portion of the side bar. A set screw with a knob 42 extends into or out of setting engagement with a curved side of the protractor. Thus once the protractor has been rotated to an angle as indicated by the cursor 39, it may be held in place with this set screw. It is this angle that establishes the width and depth of the cove.

Finally, the setup device has a fence guide bar 45 from which two rods or pins 46 that extend through channels in two protractor blocks 39. Set screws with knobs 49 are extendable into these channels to set the rods 46 and thus the position of the guide bar 45 relative to the protractor. Each rod bears a scale in inches that is used in setting the distance x of the cove from the edge of the molding.

In use the insert 13 is removed from the table top and the platform 20 inserted into the table top recess with the fork set upon the arbor 23 as shown in FIG. 5. Its axial location along the top of the arbor is set by the snug fit of the platform within the recess. The slide bar is then slid atop the platform for the blade height indicated on its scale in alignment with the cursor 33. To insure a level mount, the platform clamping stud 26 is clamped with a clamp 48 as also shown in FIG. 5 aside the face of a leveling block 47 mounted atop the table top 12. The protractor 36 is rotated to bring the desired angle a indicia into alignment with the cursor 39. The guide bar 45 is set with the desired distance x indicated on rods 46 where they emerge from blocks 39. The fence 16 is then placed flush against the guide bar upon the table top and clamped in place in the conventional manner. The setup device is removed and the insert 13 replaced.

It thus is seen that a cove molding setup device is now provided that enables one to locate a rip fence on a saw table top in a position that will enable a cove of a desired depth and width and location to be made with precision and free of guess work. While the invention has been described and shown in its preferred form, it should be understood that many modifications, additions and deletions may be made to this form without departure from the spirit and scope of the invention as set forth in the following claims.

What is claimed is:

1. A cove molding setup device comprising a platform having a bottom fork adapted to be supported upon a saw table arbor beside a disc blade; a slide bar mounted upon said platform at a plurality of transverse positions with respect to said base fork; a protractor mounted to said slide bar at a plurality of rotatably adjustable angles about a pivot; and a fence guide bar adjustably mounted to said protractor at a plurality of distances from said pivot.

2. The cove molding device of claim 1 wherein said platform has a top formed with a track along which said slide bar may be adjustably positioned and a cursor located adjacent said track vertically aligned above said fork, and wherein said slide bar has a scale adjacent said base cursor.

3. The cove molding device of claim 1 wherein said slide bar has a set screw mounted adjacent said protractor and a cursor aligned with said set screw.

4. The cove molding device of claim 1 wherein said platform has a channel in which the table saw blade may extend, and wherein said pivot is planarly aligned with said base channel offset from said fork.

5. The cove molding device of claim 1 wherein said fence guide bar has at least one adjustment bar that bears a scale and wherein said protractor has a channel through which said guide bar adjustment bar is journaled through said protractor channel.

6. The cove molding setup device for a saw table that has a disc blade which emerges from and penetrates the plane of the table top at a blade intersection point, and with the device comprising a platform adapted to be mounted to the saw table over the blade, a rip fence guide bar, means for mounting said fence guide bar upon said platform for rotational adjustment about a pivot, and means for positioning said pivot within the plane of the blade at selected distances offset from the blade intersection point.

7. The cove molding setup device of claim 6 wherein said pivot positioning means comprises a slide bar slidably mounted upon said platform for reciprocal adjusting movement along a tack bearing a scale.

8. The cove molding setup device of claim 7 wherein said rip fence guide bar mounting means includes protractor means for indicating the angle of said fence guide bar with respect to said slide bar.

9. A method of locating a rip fence upon a saw table for the cutting of a cove of a selected cove depth and width at a selected spacing from a linear edge of a strip of molding, and with the method comprising the steps of locating a pivot in the plane of the saw table laterally offset from the axis of blade rotation a distance relative to the maximum height of the blade above the saw table; positioning a fence guide bar at a distance from the pivot relative to the desired spacing of the cove from an edge of the molding, and angularly positioning the guide bar with respect to the blade plane about the pivot at an angle equal to a function of the desired depth and width of the cove.

\* \* \* \* \*